No. 785,130. PATENTED MAR. 21, 1905.
W. VANDERMAN.
PIPE FITTING.
APPLICATION FILED MAY 6, 1904.
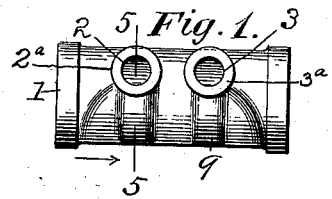
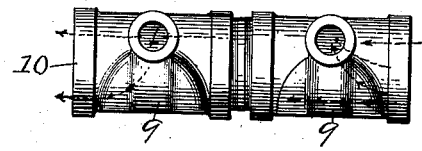
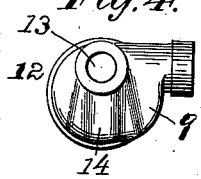 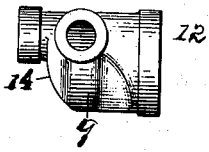
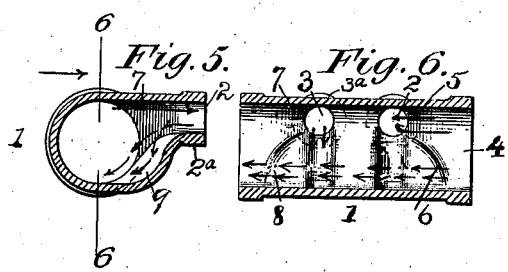 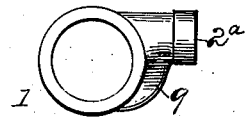
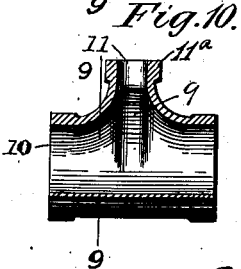
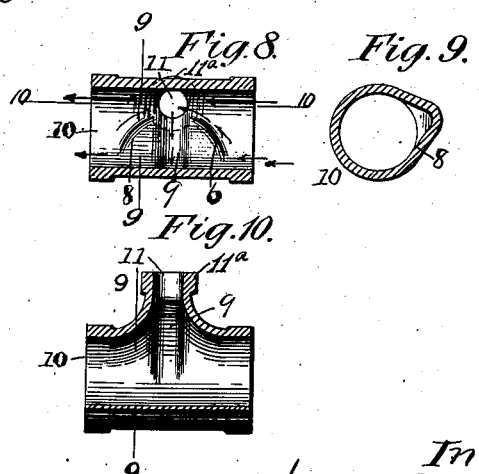
Witnesses:
Lena H Berkovitch
Cora M. Atwood
Inventor:
William Vanderman
by Jenkins & Barker
Attorneys No. 785,130. Patented March 21, 1905.

UNITED STATES PATENT OFFICE.

WILLIAM VANDERMAN, OF WILLIMANTIC, CONNECTICUT.

PIPE-FITTING.

SPECIFICATION forming part of Letters Patent No. 785,130, dated March 21, 1905.

Application filed May 6, 1904. Serial No. 206,776.

*To all whom it may concern:*

Be it known that I, WILLIAM VANDERMAN, a citizen of the United States, and a resident of Willimantic, in the county of Windham and State of Connecticut, have invented a new and Improved Pipe-Fitting, of which the following is a specification.

My invention relates to the class of fittings more especially used in connection with steam or hot-water heating systems, and is particularly adapted to a system known as the "one-main pipe system," in which a single main pipe is used to conduct the heating fluid both away from and back to the boiler; and the object of my invention is to provide a device of this class in which the circulation of the fluid through the pipe may be aided to the greatest extent; and a further object is to provide a device in which the currents of different temperature shall be kept from interfering each with the other.

A device in the use of which these objects may be attained is illustrated in the accompanying drawings, in which—

Figure 1 is a side view of a fitting embodying my improvement having a connection for two branches. Fig. 2 is a side view of two fittings united and each provided with a single branch forming a connection for use with double branches. Fig. 3 is a side view of a fitting employed to reduce the size of the main and the branch. Fig. 4 is an end view of the same. Fig. 5 is a detail view in cross-section through the fitting shown in Fig. 1 on line 5 5. Fig. 6 is a detail view in lengthwise section through said fitting on line 6 6. Fig. 7 is an end view of the same. Fig. 8 is a detail view, in lengthwise section, through one of the fittings shown in Fig. 2. Fig. 9 is a view in cross-section through the same on the ling 9 9 of Figs. 8 and 10. Fig. 10 is a view in lengthwise horizontal section through the fitting shown in Fig. 8 on plane denoted by line 10 10.

It is a known fact that the one-main system of heating is preferable to the two-main pipe system, provided the single-main pipe system can be made to work effectively. The single-main pipe system is preferable for various reasons. The main pipe answering the purpose of the flow of fluid from and return to the boiler relieves the necessity for the use of two lines of main piping, and thus of course reduces the cost of labor and material in installing the plant, the reduction of the number of joints lessens the liability of leaks, and the system is simplified, and there is less friction to be overcome therein. The space occupied by the single system is also much less and the exposed or radiating surface of piping is greatly reduced. Less skill is required to install the single-main system of piping than to install the two-main system of piping, the latter necessitating a complication of connections. In the one-pipe system there is also less liability, on account of the reduced length of pipe, for the formation of air-pockets, and the air is more readily discharged, and reverse currents are more readily avoided in the use of the single-pipe system.

In the use of the single-pipe system in practice the main flow-pipe extends from the top of the heating-boiler on an upward grade to the point of location of the first branch and from this point gradually descends toward the boiler, which it enters at or near the bottom. By this construction there is a continuous circulation from the highest part of the boiler to the lowest part. In such a system of heating there is a tendency for the warm or hot fluid to travel along the upper part of the main pipe and the colder fluids travel along the lower part of the main pipe. It is essential to the proper working of such a system that all air-pockets shall be avoided and that means shall be employed for aiding the discharge of air from the system by causing it to travel to points where the system is relieved therefrom. It is also essential that the hotter and colder currents of fluid shall be separated throughout the entire length of the main, so that the one will not interfere with the flow of the other, and further that the hotter currents shall not be cooled by reason of the intermingling of the colder fluid.

In my invention as illustrated and described herein I have provided a fitting in which all of the advantages above described are present and the circulation of the heating fluid through a one-main pipe system is maintained to a satisfactory degree.

My fitting constitutes a joint connection for the main at points where branches are led from the main or where the main is reduced, but principally at points where branches are to be led from the main, which frequently is also reduced at the same point.

As shown in Figs. 1, 2, 5, 6, and 7 of the drawings, the fitting is especially applicable to a single-main heating system employing water as the heating medium, the connection 1 having two branch openings, the opening 2 in the branch 2ª nearest the boiler being termed the "flow-opening" and the opening 3 in the branch 3ª, located farther away from the boiler, being termed the "return-opening." Each of these openings extends from the upper part of the opening through the main. In fact, the upper walls of each of the openings 2 and 3 are flush with the upper wall of the opening through the connection or main. By this construction the hotter fluid traveling along the upper part of the main is maintained at the upper part of said main and flows through the opening 2 into the branch leading from the main. The opening from the main chamber 4 of the connection is gradually curved, as at 5, into the branch opening or connection, and it also is curved gradually upward, as at 6, into said branch opening or connection, so that the turn from the main chamber in the connection into the branch is gradual and the current is gradually conducted into the branch. The branches themselves are not shown in the drawings, merely the connection for said branches being indicated. However, it will be readily understood that the branches consist of pipes secured in the openings, as indicated at 2 and 3, and thus these openings are designated as "branch" openings or connections. A similar construction is provided in connection with the opening 3 to its branch 3ª, the opening out of said branch gradually leading into the chamber 4 by the curved surface 7, curved in a horizontal direction, and a curved surface 8, formed in a vertical plane. By this construction it will be seen that the connection may be used with either of the openings 2 or 3 employed as a flow or return.

In order to conduct the colder fluid from the branch into the main, I provide a channel 9, located in the connection. The connection is so constructed that this channel communicates with the branch at a point back of the main chamber through the connection. The channel gradually curves downward into the main, so that the colder fluid traveling along the bottom of the branch is led by this channel directly into the bottom of the main, the colder fluid finding its lowest point in the connection before it enters the main chamber through the main. This construction, in fact, provides practically two channels, one leading from the upper part of the chamber in the main for the flow of hot fluid and the other leading into the lowest part of the chamber in the main for the flow of colder fluid. Both of the openings 2 and 3 in the branches 2ª and 3ª are provided with such a channel 9 for the flow of colder fluid, so that the connection may be used with either end located toward the boiler.

In the form of device shown in Figs. 8 and 10 the connection 10 is more especially applicable for use in connection with steam-heating, a single branch opening or connection 11 in the branch 11ª being employed to conduct steam to the radiators and the water of condensation traveling backward through the same branch to the main pipe. In this connection, however, I employ the same construction of curved surfaces 6 and 8, leading downward into the main chamber, and of the curved surfaces (located in this instance on each side of the branch opening) into the main in a horizontal direction from said main chamber. This fitting is also provided with the channel 9 for conducting the water of condensation to the lowest part of the main.

In Fig. 2 of the drawings this fitting with a single branch opening is shown as adapted to form a two-branch connection, which may be used in the same manner as the single two-branch connection shown in Fig. 1.

In Figs. 3 and 4 of the drawings a connection 12 is shown in which the main is reduced, as at 13. In this form of the fitting, however, the opening into the branch is constructed in the same manner as hereinbefore described, the curved surface from the main chamber into the branch being constructed in the same manner and the channel being provided. In addition thereto a channel 14, similar to channel 9, is employed, leading into the reduced part of the main.

In the form of the device shown in Figs. 1, 5, and 6 it will be noted that the surface leading from the main into the branch is gradually rounded or curved into the latter in the direction of flow, and the turn on the opposite side is abrupt—that is, as seen in Fig. 6 the curved surface 5, leading from the boiler and directing the flow of hot fluid into the branch 2ª, is gradually curved on the side toward the boiler, but is abrupt on the opposite side, whereas in the opening 3, leading from the branch or through the return-opening, the curved surface 7 curves away from the boiler in the direction of flow of the colder fluid and is denoted by arrows, the colder fluid traveling down the channel 9 and, if required, also utilizing the curved surface 8 to conduct it to the lower part of the main. This curved surface 8, however, will be found available only in a few instances.

In the drawings as shown herein the arrows indicate the direction of flow of fluid through the system, the longer arrows indicating the flow of hot fluid and the shorter arrows the flow of the colder fluid.

The channel 9 is made of an area sufficient to conduct under all ordinary circumstances the entire flow of colder fluid from the branch into the lower part of the main, and, as before stated, it will be seen from a reference to Fig. 5 that this colder fluid is conducted downward before it reaches the main to a point where it is led into the main at the lowest level.

By the employment of the connection herein shown the greatest freedom of movement is allowed to currents traveling in the opposite direction and said currents are kept practically free each from the other, so that there is no interference or intermingling of the one with the other, and therefore the full advantages may be derived and the full heating capacity obtained from the heating fluid. The flow of water into the branch is so gradual that the flow through the main is not disturbed, and the flow through the main is therefore maintained normal at the points where a flow is permitted into a branch. This construction also avoids any air-pockets, and any air which may have accumulated in the system is readily conducted along the system to a point where it is readily discharged.

It will be noted that the connection with the branch is, in effect, two connections embodied in a single chamber, the opening from the branch connecting with the full diameter of the main, but united into one smaller opening in the branch beyond the body of the fitting.

It is obvious that the details of construction of this fitting may be departed from to a greater or less extent without departing from the invention, and I do not desire to limit myself to the precise construction herein shown and described.

What I claim as my invention, and desire to secure by Letters Patent, is—

1. A pipe fitting or connection having a main chamber and a branch with an opening of smaller area communicating therewith, providing a direct-flow passage from the main chamber to the branch adjacent to the top of the main chamber, and having a flow-passage connecting the bottom of the branch and bottom of the main chamber and arranged outside of the direct line of the main chamber.

2. A pipe fitting or connection having a main chamber and a branch with an opening of smaller area communicating therewith and having a flow-passage of a width corresponding to the diameter of the opening in the branch, and connecting the bottom of the branch and the bottom of the main chamber and arranged outside of the direct line of the main chamber.

3. A pipe fitting or connection having a main chamber and a branch with an opening of smaller area communicating with the upper part of said chamber and forming a direct flow-passage between the main chamber and the branch, and a channel extending from said branch to the lowest part of the chamber and offset from the main chamber.

4. A pipe fitting or connection having a main chamber with a branch opening or connection communicating with the upper part of the chamber, and provided with a gradually-curved wall between the main chamber and the branch extending in the direction of flow of fluid thereto, and a channel offset from the main chamber and leading from the branch into the lower part of said main chamber.

5. A pipe fitting or connection having a main chamber with a branch communicating therewith of smaller area and with one wall flush with the wall of the main, a channel extending from the branch to a point flush with the opposite wall of the main, and a surface gradually curving into the branch in the direction of flow of fluid.

6. A pipe fitting or connection having a chamber with a branch of smaller area communicating therewith, the wall of the chamber adjacent to the branch curving gradually thereinto in all directions of flow of fluid to said branch but curving abruptly away from said branch in the opposite direction, and a channel portion leading from said branch to the lowest part of the chamber.

7. A pipe fitting or connection having a main chamber with an opening of smaller area communicating therewith, providing a direct-flow passage for hot fluid from the main chamber, and having a flow-passage connecting the bottom of the smaller opening and the bottom of the main chamber and arranged outside of the main wall of the main chamber.

8. A pipe-fitting including a body part having a chamber with an opening of equal area thereto, and a plural number of smaller openings communicating therewith, the upper walls of each of said smaller openings being of a height at least equal to that of the upper wall of said chamber whereby a flow-surface for hot fluids in directions out of said chamber is provided, the lower walls of said chamber gradually sloping and merging into the bottom of each of the small chambers, whereby a flow-surface for colder fluid into said chamber is provided.

9. In combination in a pipe-fitting, a body part having a chamber with an opening of equal area thereto and a plural number of openings of smaller area communicating therewith, the upper walls of the smaller openings being of a height at least equal to that of the upper wall of the chamber whereby a flow-surface for hotter fluid into the smaller passage is provided, the said wall curving gradually from the chamber into a lateral opening in the direction of flow of fluid thereto, but curving abruptly into the chamber on the opposite side of the lateral opening, the bottom walls gradually sloping from the bottom of the chamber to the bottom of each of the smaller openings.

WILLIAM VANDERMAN.

Witnesses:
ARTHUR B. JENKINS,
LENA E. BERKOVITCH.